No. 861,143. PATENTED JULY 23, 1907.
T. S. SCOTT.
MEANS FOR SECURING WHEELS TO SHAFTS OR AXLES.
APPLICATION FILED DEC. 4, 1905.
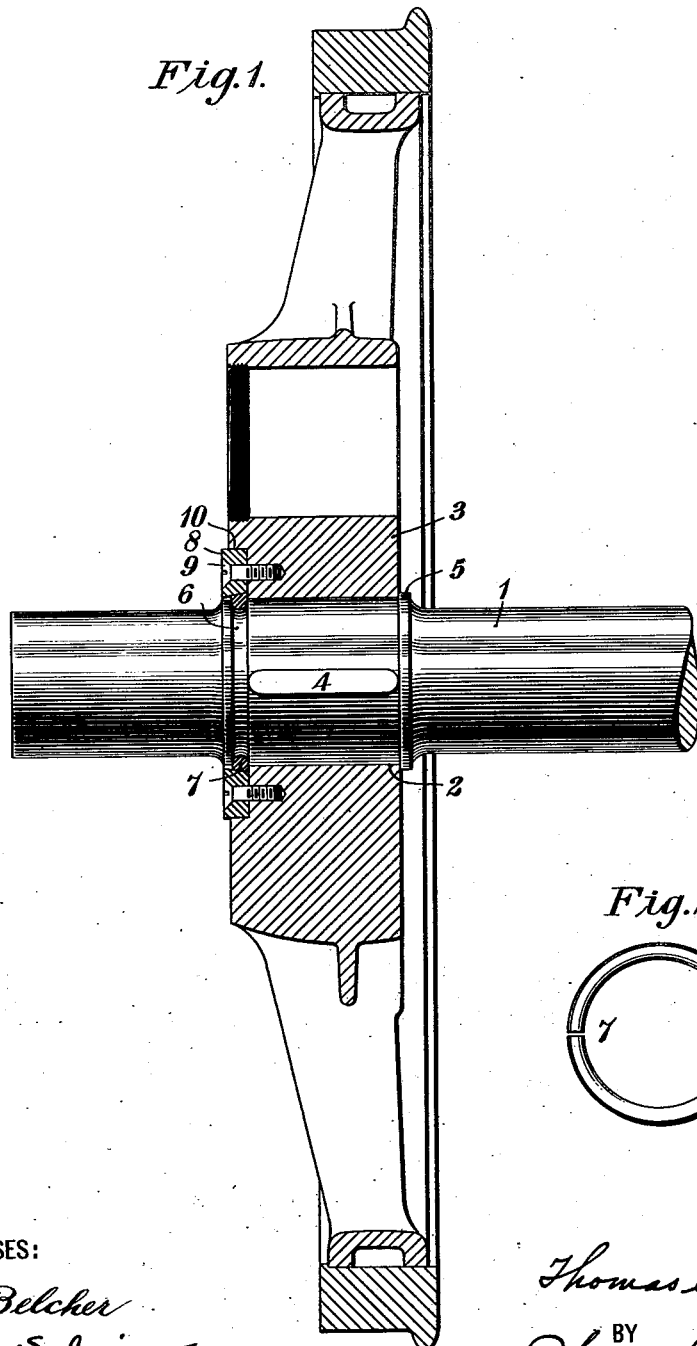
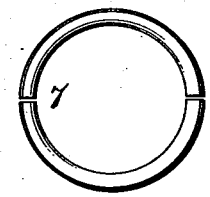
WITNESSES:
C. L. Belcher
Otto S. Schairer
INVENTOR
Thomas S. Scott
BY
Wesley G. Carr
ATTORNEY

UNITED STATES PATENT OFFICE.

THOMAS S. SCOTT, OF PITTSBURG, PENNSYLVANIA, ASSIGNOR TO WESTINGHOUSE ELECTRIC & MANUFACTURING COMPANY, A CORPORATION OF PENNSYLVANIA.

MEANS FOR SECURING WHEELS TO SHAFTS OR AXLES.

No. 861,143.      Specification of Letters Patent.      Patented July 23, 1907.

Application filed December 4, 1905. Serial No. 290,306.

*To all whom it may concern:*

Be it known that I, THOMAS S. SCOTT, a citizen of the United States, and a resident of Pittsburg, in the county of Allegheny and State of Pennsylvania, have invented a new and useful Improvement in Means for Securing Wheels to Shafts or Axles, of which the following is a specification.

My invention relates to means for securing wheels or pulleys to axles or shafts and particularly to means for securing locomotive driving wheels upon their axles, and it has for its object to provide a novel and improved means of the character indicated.

Electric motors that are employed for the propulsion of vehicles are frequently mounted upon quills that surround the driving axles and that are flexibly connected to the driving wheels. Whenever it is desired to remove such motors from the axles, it becomes necessary to remove also one or both of the driving wheels; and in order to facilitate such operations, I have provided means whereby such driving wheels may be more readily removed from and replaced upon the axles than has heretofore been possible.

Figure 1 of the accompanying drawing is a view, in section, of a driving wheel that is mounted upon an axle in accordance with my invention, and Fig. 2 is a view of one of the parts whereby the driving wheel is secured in position upon the axle.

A shaft or axle 1, that may, as here illustrated, be the driving axle of a locomotive or other vehicle, is provided with an enlarged portion 2 upon which a wheel 3 is adapted to be pressed, a key 4 serving to prevent relative rotation between the wheel and the axle. The axle is further provided with a flange 5 at the inner end of the enlarged portion 2, with which one face of the wheel 3 engages, and with a circumferential recess 6 at the other end of the enlarged portion, in which is located a ring 7, to form a flange at the outer face of the wheel. In order to facilitate placing of the ring in the recess, it is preferably formed in two parts, as illustrated in Fig. 2, though, when practicable, it may be split at a single point only and sprung into position, or it may be formed of any other desired number of parts. The outer circumferential face of the ring is frustoconical in form and is engaged by the similarly shaped, though oppositely inclined, inner circumferential face of a ring 8 that is clamped to the outer face of the wheel by any suitable means, such as tap bolts 9, the ring 7 being forced into the circumferential recess 6 by the wedging action exerted upon it by the ring 8. In practice, it will generally be found most expedient to provide an annular recess 10 in the outer face of the wheel adjacent to the aperture through which the shaft projects for the reception of the ring 8, though it may be omitted, if desired.

It will be readily understood that in assembling the structure the wheel is first pressed upon the axle until its inner face engages the flange 3, then the ring 6 is placed in position in the circumferential recess 4 and the ring 8 is finally clamped to the outer face of the wheel, the ring 6 being forced into position in the recess by the wedging action of the engaging frusto-conical surfaces of the rings.

I claim as my invention:

1. The combination with a shaft or axle having a circumferential recess, of a wheel mounted thereon, a segmental ring located partially in the shaft or axle recess, and means to engage the external periphery of the ring and force it into the recess.

2. The combination with a shaft or axle having a circumferential recess, of a wheel mounted thereon, a ring partially located in the shaft or axle recess, and another ring so fastened to the wheel as to exert radial pressure against the periphery of the first named ring.

3. The combination with a shaft or axle having a circumferential recess, of a wheel mounted thereon, a ring having a frusto-conical exterior surface and located in the recess in the shaft or axle, and another ring secured to the wheel and having a frusto-conical interior surface to engage the aforesaid ring and force it into the recess in the shaft.

4. The combination with a shaft or axle having a circumferential recess, of a wheel mounted thereon, a ring partially located in the recess in the shaft or axle and means for exerting inward radial pressure upon the ring to force it into the recess.

5. The combination with a shaft or axle having a circumferential recess, of a wheel mounted thereon, a ring located partially in the shaft or axle recess but projecting radially against one side of the wheel, and means for forcing the ring radially inward.

6. The combination with a shaft or axle having a circumferential recess, of a wheel mounted thereon having an annular recess in one face adjacent to the shaft or axle, a ring located in the circumferential recess in the shaft or axle, and another ring secured in the annular recess in the wheel and serving to retain the aforesaid ring in the circumferential recess.

7. The combination with a shaft or axle having a circumferential recess, of a wheel mounted thereon having an annular recess in one face adjacent to the shaft or axle, a ring having a frusto-conical exterior surface and located in the circumferential recess in the shaft or axle and another ring having a frusto-conical interior surface that engages the exterior surface of the aforesaid ring, and means for securing the latter ring in the annular recess in the wheel.

8. The combination with a shaft or axle having a shoulder and a circumferential recess, of a wheel mounted thereon with one face against the shoulder and provided with an annular recess in the other face adjacent to the shaft or axle, a ring located in the circumferential recess in the shaft or axle to prevent removal of the wheel, and a second ring secured in the annular recess in the wheel to secure the first ring in position.

9. The combination with a shaft or axle having a shoulder and a circumferential recess, of a wheel mounted on the shaft or axle between the shoulder and the recess, ring segments located partially in the shaft or axle recess, and a ring so fastened to the wheel as to exert radial pressure against the ring segments to force them into the recess in the shaft.

In testimony whereof, I have hereunto subscribed my name this 22 day of November, 1905.

THOS. S. SCOTT.

Witnesses:
L. LOWRY,
A. M. READ.